June 12, 1934.  M. OSNOS  1,962,210
TEMPERATURE CONTROL OF PIEZO ELECTRIC CRYSTAL HOLDERS
Filed Jan. 28, 1932
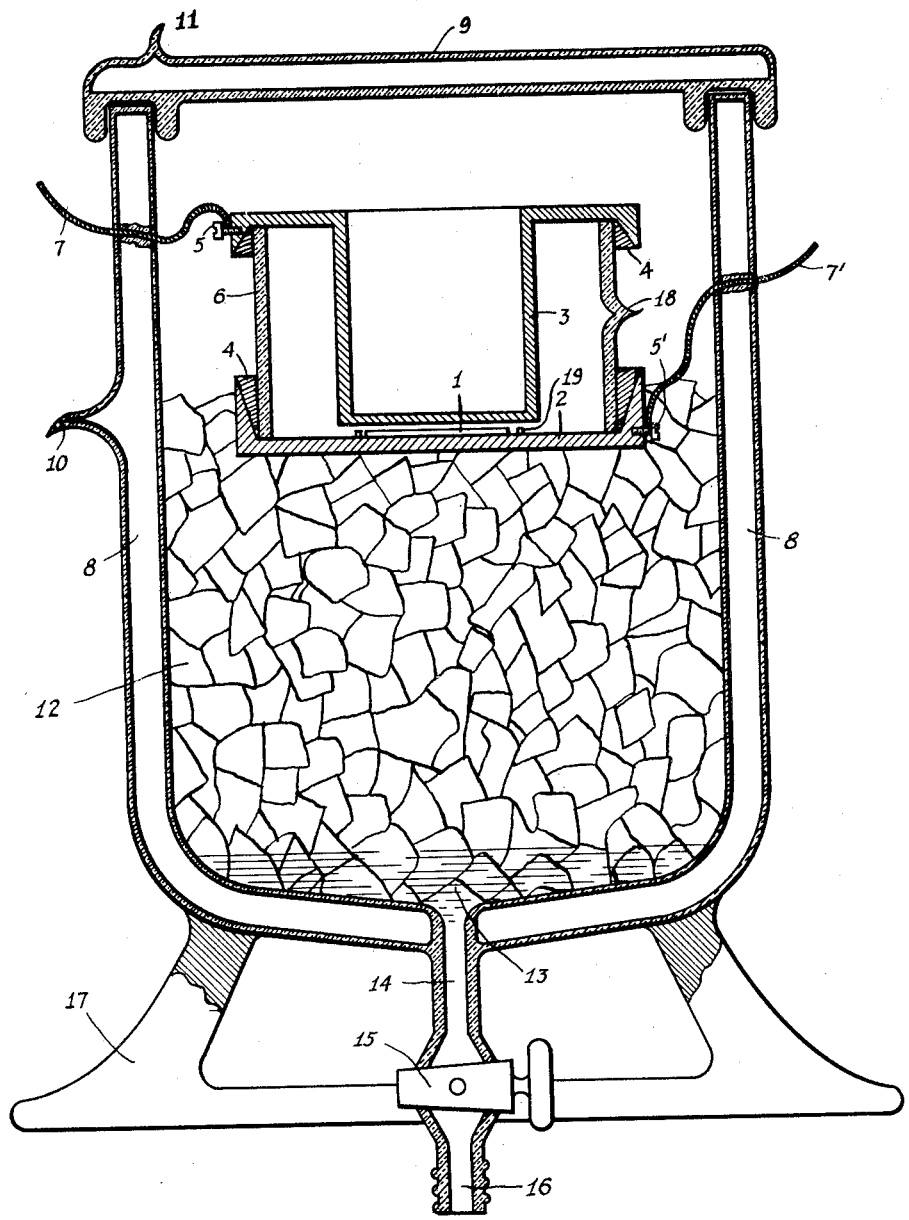
INVENTOR
MENDEL OSNOS
BY
ATTORNEY Patented June 12, 1934

1,962,210

UNITED STATES PATENT OFFICE 1,962,210

TEMPERATURE CONTROL OF PIEZO-ELECTRIC CRYSTAL HOLDERS

Mendel Osnos, Berlin, Germany, assignor to Telefunken Gesellschaft fur Drahtlose Telegraphie m. b. H., a corporation of Germany Application January 28, 1932, Serial No. 589,442
In Germany January 30, 1931

3 Claims. (Cl. 171—327)

This invention relates to temperature control apparatus and more particularly to apparatus for stabilizing the frequency of piezo-electric crystals.

It is known that the wave length constancy of valve transmitters subject to the control of piezo-electric crystals is substantially a function of the temperature of the crystal. In order to maintain the temperature at a constant value a number of schemes have been disclosed in the prior art; but these without exception are more or less complicated in nature.

According to the invention the temperature of the crystal most simply is stabilized by that the crystal (set in a suitable holder) is in thoroughly heat conductive metallic connection with ice at a temperature of zero degrees or practically so, or with some other medium of such temperature or constant temperature so that the fall in temperature between the crystal and the chilling medium is zero or nearly so. It is of advantage to maintain the layer of ice or other refrigerant constant both as regards its state of aggregation and its volume. This may be accomplished, for instance, in this manner that the crystal, its setting means and the layer of ice are confined inside a sort of thermos bottle, ice box with double walls, etc., with provision of means insuring from time to time the draining of the slight quantities of melted water and replenishing of the ice. Inasmuch as the temperature of ice is always equal to zero it follows that also the temperature of the crystal will be nearly zero, provided that the crystal losses are low in themselves, and if in addition care is taken so that the losses due to such heat as is dissipated within the crystal are readily conducted to the ice.

The crystal setting means must be so built that it will protect the crystal against the ice and all moisture lest the crystal would be incapable of oscillating. In order to minimize the losses it is of advantage to evacuate the surroundings of the crystal, while in order that the carrying away of the heat from the crystal may be promoted it is suitable to make the electrodes a substantial part of the outer surface of the crystal setting or holder.

The accompanying drawing shows an embodiment of the basic idea of this invention by way of example.

Referring to the same, 1 denotes the crystal, 2 and 3 the metallic electrodes, 4 a cement, 5, 5' the fastening screws for the supply leads, 6 the glass tube, 7, 7' the leads, 8 a double-walled exhaust glass vessel, 9 a double-walled exhausted cover, 10, 11 and 18 the pump stems, 12 the ice, 13 the molten water, 14 the drain pipe, 15 the drain cock, 16 the water outlet, 17 the base and 19 spacer pins.

Crystal 1 is placed upon the metal plate 2 and is maintained in the proper position by means of the spacer pins 19. The plate 2 constitutes at the same time a crystal electrode which by means of screw 5' and lead 7' is connected with the grid and the ground, respectively. Above the crystal is placed the cooperating electrode 3 which by means of the cylindrical glass tube 6 is kept in the proper distance away from the crystal, and which likewise is united with the transmitter by means of the screw 5 and the lead 7.

The two electrodes are welded or cemented together with the glass tube so as to secure both hermetical and water-tight condition.

By way of the pump stem 18 the ambient of the crystal is exhausted, whereupon the stem is sealed off.

The crystal holder rests with the electrode 2 upon a layer of ice 12 which is kept under heat insulated conditions from the surroundings in well known manner by means of the double-walled and exhausted vessel 8 provided with a similar cover 9.

If desired a similar crystal holder of the type described and claimed in my copending application Serial No. 589,445, filed January 28, 1932, may be employed to protect the crystal against the ice and all moisture.

Such slight quantities of molten water as are formed as indicated at 13 are drained from time to time by way of the drain outlet 14, cock 15 and drain pipe 16, so that the plate 2 will always be supported by ice and that the said electrode as well the crystal 1 bearing thereon will always be kept at zero temperature or that of the ice. In order that during the melting of the ice also the crystal setting means may be able to slide down, the leads have been made flexible.

At relatively long time intervals (say, once in 24 hours) the container may be filled up with ice again. It will be understood that also the container formed by the electrode 3 may be filled up with ice, or else the entire crystal holder may be covered with snow. The crystal setting or holder means could be set into the ice container also in some other way or position, for instance, inversely. The ice container or box could be built also in some other known manner, say, triple or multiple walled.

For the object of insuring mechanical protection for the glass walls thereof, it may be found preferable to surround the cooler or refrigerator in known manner by a suitable metallic casing or sheath insulated, for instance, by means of glass wool.

What is claimed is:

1. Arrangement adapted to stabilize the frequency of transmitting valves controlled by piezoelectric crystals, comprising an evacuated piezoelectric crystal holder having electrodes which constitute a substantial outer portion of said crystal holder contained within a double side wall and a cover with a double wall providing an electrical and thermal insulated vessel, a pair of leads passing through the said side walls, said vessel containing a suitable refrigerant to maintain said crystal at substantially zero temperature.

2. Arrangement adapted to stabilize the frequency of transmitting valves controlled by piezoelectric crystals, comprising an evacuated piezoelectric crystal holder having electrodes which constitute a substantial outer portion of said crystal holder contained within a double side wall and a cover with double walls providing an electrical and thermal insulated vessel, said vessel containing packed ice to maintain said crystal at substantially zero temperature.

3. Arrangement adapted to stabilize the frequency of transmitting valves controlled by piezoelectric crystals, comprising an evacuated piezoelectric crystal holder contained within double side walls and a cover having double walls with double flanges for securing the cover to said side walls and providing an electrical and thermal insulated vessel, said vessel containing a valve for draining purposes and a supporting base for said vessel, a suitable refrigerant to maintain said crystal at substantially zero temperature.

MENDEL OSNOS.